United States Patent [19]

Medlin

[11] 4,316,404
[45] Feb. 23, 1982

[54] LIGHTWEIGHT ARMORED VEHICLE AND METHOD OF MAKING SAME

[76] Inventor: Richard C. Medlin, 4728 Goldfield, San Antonio, Tex. 78218

[21] Appl. No.: 920,715

[22] Filed: Jun. 30, 1978

[51] Int. Cl.³ .............................................. F41H 7/04
[52] U.S. Cl. ..................................... 89/36 H; 52/171; 52/788; 296/84 R; 296/146; 428/911
[58] Field of Search ...................... 296/10, 146, 84 R; 89/36 R, 36 A, 36 L, 36 H; 52/788, 789, 790, 171; 428/911

[56] References Cited

U.S. PATENT DOCUMENTS

| | | | |
|---|---|---|---|
| 1,956,628 | 5/1934 | Rutishauer | 52/789 X |
| 2,226,833 | 12/1940 | Rider | 296/84 R |
| 2,743,035 | 4/1956 | Fogarty | 89/36 R |
| 3,000,772 | 9/1961 | Lunn | 428/911 X |
| 3,239,385 | 3/1966 | Meyers | 222/389 X |
| 3,404,810 | 10/1968 | Beers | 222/389 X |
| 3,437,245 | 4/1969 | Hebert et al. | 222/389 |
| 3,455,409 | 7/1969 | Clark | 89/36 R |
| 3,581,621 | 6/1971 | Bauer | 89/36 L |
| 3,630,814 | 12/1971 | Arnold | 52/789 X |
| 3,788,667 | 1/1974 | Vancil | 222/5 |
| 3,855,898 | 12/1974 | McDonald | 89/36 L |
| 3,889,434 | 6/1975 | Shelver | 52/788 |
| 3,924,038 | 12/1975 | McArdle | 89/36 A |
| 4,027,443 | 6/1977 | Briggs | 52/788 |
| 4,061,815 | 12/1977 | Poole | 89/36 A |

FOREIGN PATENT DOCUMENTS 1432466 2/1966 France ................................. 89/36 H
1318145 5/1973 United Kingdom ............... 89/36 H Primary Examiner—John A. Pekar

[57] ABSTRACT

A lightweight armored vehicle and method of making the same is shown. The interior or a standard automobile to be equipped with lightweight armor is first stripped of its interior furnishings. Mechanisms to raise or lower the windows are removed. Doors and window frames are rebuilt to rigidly mount a bulletproof transparent window therein. Vertical walls of the automobile are bulletproofed by adding lightweight woven polyglass rigidly formed with a resin-catalyst mixture. Additional bullet resistant strength may be provided by multiple layers of ballistic nylon or Kevlar bonded to the rigid polyglass. For surfaces not normally subject to perpendicular penetration by bullets, only ballistic nylon or Kevlar is inserted. Upon reassembly of the automobile, including rebuilding portions of the exterior body around the doors and windows, options such as a tear gas dispersal system can be added. A steel screen between layers of the woven polyglass adds additional bullet resistant strength. The same material may also be used for new cars.

17 Claims, 18 Drawing Figures

LIGHTWEIGHT ARMORED VEHICLE AND METHOD OF MAKING SAME

BACKGROUND OF THE INVENTION

This invention relates to armored vehicles and, more particularly, to either a method of retrofitting a standard automobile to make it a lightweight armored vehicle or building a new lightweight armored vehicle. The passenger compartment is encapsulated in bulletproof windows, rigidly formed woven polyglass fibers embodied in an epoxy resin, and ballistic nylon or Kevlar material to prevent penetration by projectiles normally used in case of attack.

BRIEF DESCRIPTION OF THE PRIOR ART

Prior to the present invention, modifying a standard automobile to give it armor protection involved retrofitting the automobile with one-quarter inch tungsten steel plate armor, securing inside of the automobile a layer of bullet resistant polycarbon laminate inside of the side windows, and installing a bulletproof front and rear window. Such a procedure detracted from the appearance of the automobile, plus increased the weight of the automobile by approximately 2800 pounds. The increased weight made the automobile difficult to handle, plus placed excess strain on the drive train thereby requiring the installation of a heavy duty transmission, rear axle drive unit and suspension system. The bolting of the bullet resistant polycarbon laminate inside of the side windows of the automobile detracted from its normal appearance, plus revealed to would-be terrorists or kidnappers that the automobile was armored. One of the most desirable features of the present armored vehicle is that it appears to be an ordinary vehicle thereby not attracting attention of the public.

While the manufacturers of luxury automobiles have in the past offered armored vehicles as standard equipment, a luxury automobile itself attracts considerable attention that would not be caused by a smaller type vehicle. Further, the luxury vehicles have the attendant disadvantage of increased weight due to tungsten steel plating contained therein, and the resultant lack of maneuverability. Even the luxury automobiles do not have the many features of the present automobile, plus the reduced weight.

SUMMARY OF THE INVENTION

It is an object of the present invention to provide a lightweight armored type vehicle.

It is another object of the present invention to retrofit a standard automobile with lightweight bulletproof armor and still maintain an outward appearance of a standard automobile.

A standard automobile is first stripped of its interior. Next, the window mechanisms are removed and a support system installed in the doors for supporting a Lexgard laminate and safety plate glass in a rigid closed position. The door frames are rebuilt to receive and seal with the newly formed side windows. The frames are also filled with bullet resistant material. The front and rear window frames are rebuilt to receive a bulletproof window therein comprising a bullet resistant glass and polycarbon laminate. The external appearance of the automobile remains essentially unchanged with the body being rebuilt to receive thicker window frames.

Vertical portions of the automobile, including the doors, side walls, fire wall and rear seat area, are retrofitted with a multiple layer woven polyglass material rigidly formed with a resin-catalyst mixture. Additional bullet resistant strength is provided by multiple layers of ballistic nylon or Kevlar attached to the rigid woven polyglass. Flat areas of the automobile, such as the top or bottom (which are not normally subject to perpendicular penetration by bullets or other projectiles during an attack) are equipped with multiple layers of ballistic nylon to prevent the reflection of projectiles therethrough. The ballistic nylon or Kevlar is secured in position by a silicone sealant. Any possible paths of entry of a projectile into the protective area of the passenger compartment of the automobile are protected by the rigid woven polyglass and/or the ballistic nylon to the degree necessary to withstand normal attacks.

To prevent possible explosion, the fuel tank is wrapped in ballistic nylon and the battery is encased in a woven rigid polyglass structure. To prevent deterioration of the Kevlar as may be caused by moisture, the Kevlar is encapsulated in an impermeable material, such as a layer of plastic, to prevent moisture contact therewith. The Kevlar, which is sewn together in multiple layers, is rigidly attached to the woven rigid polyglass by a suitable bonding material, such as silicone construction sealant 1400 manufactured by General Electric Company. The stitching of the ballistic nylon or Kevlar prevents separation of the layers in the event of penetration by a projectile. If bullets are fired into the side of the door, the layers of woven rigid polyglass will flatten and/or disperse the projectile over a larger area with the interior multiple layers of Kevlar catching any remaining fragments from the projectiles. Consequently, none of the projectile will enter the protected area of the passenger compartment. The safety plate glass gives additional strength to the side windows when used in combination with the polycarbon laminate.

The front and rear windows are manufactured by Pittsburgh Plate Glass Company and include an inner ¼ inch layer of bullet resistant polycarbon laminate and an outer ¾ inch layer of bullet resistant glass. Lexgard is a transparent bullet resistant sheet manufactured by General Electric Company. The ballistic nylon is manufactured by the Amerbelle Corporation in Rockville, Conn. Kevlar, an aromatic polyamide material which is much more expensive than ballistic nylon but has higher bullet resistant strength, is manufactured by J. P. Stevens Company. Kevlar will deteriorate if subjected to moisture, as will the ballistic nylon, but not as rapidly. Therefore, it must be protected against moisture. The fiberglass used in forming the rigidly woven polyglass panel is woven glass roving style 775 manufactured by Fiber Glass Industries Incorporated, Amsterdam, N.Y.; however, others could be used provided they give the strength desired. A resin-catalyst presently being used to form the rigid woven polyglass panel is methyl ethyl ketone peroxide in dimethyl phthalate sold under the name Cadox M-105 by Noury Chemical Corporation in Burt, N.Y.; however, other resins could be used.

DESCRIPTION OF THE PREFERRED EMBODIMENT

Figure 1:
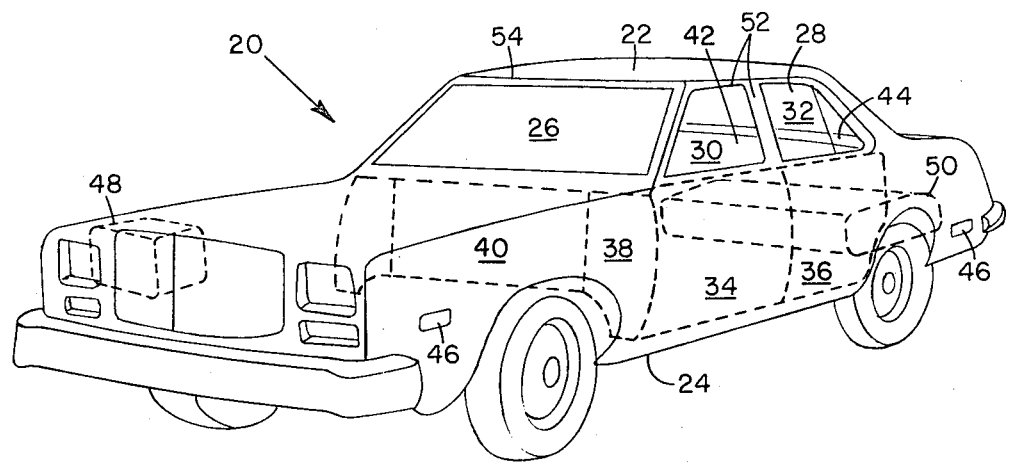
FIG. 1 is a perspective view of a standard automobile retrofitted with lightweight armor.

The automobile represented generally by reference numeral 20 as shown in FIG. 1 appears to be a standard size American automobile somewhere below the luxury line of vehicles. However, sight can be deceiving because the automobile 20 has been retrofitted to be an armored vehicle. For example, the top 22 has installed in the headliner a 24-ply ballistic nylon, as well as the floor panel 24. The windshield 26 and the rear window 28 have special built frames that receive bullet-proof glass and bullet-resistant polycarbon laminate therein. The front and rear door windows 30 and 32, respectively, have been replaced with safety plate glass and a bullet-resistant polycarbon laminate.

Installed inside of the front and rear doors is a lightweight woven polyglass material rigidly formed by a resin-catalyst mixture with an innerline of 24-ply Kevlar. The side kick panels contain a 7-ply rigid woven polyglass in combination with a 24-ply ballistic nylon, and if necessary, multiple layers of rigidly formed woven polyglass. The back panel 42 and package tray 44 are reinforced with 18-ply rigidly formed fiberglass. If additional bullet-resistant strength is felt to be necessary, multi-layers of Kevlar may be included therein. A tear gas dispersal system is contained behind reflectors 46. To provide additional or less strength, either more or less layers of ballistic nylon, Kevlar or polyglass may be used.

To still supply electrical power to the vehicle in case the engine is disabled, dual batteries are provided, which batteries are housed in an 18-ply rigidly formed fiberglass battery box 48. To prevent explosion of the gas tank 50, the gas tank 50 is wrapped in a 30-ply ballistic nylon. The door frames 52 are built to receive the rear and front door windows 32 and 30 therein as will be explained in more detail subsequently. Front and rear window frames 54 extend outward from the automobile 20 to receive the new windshield 26 and rear window 28 with the body portion of the automobile 20 being reformed, contoured and painted.

Figure 2:
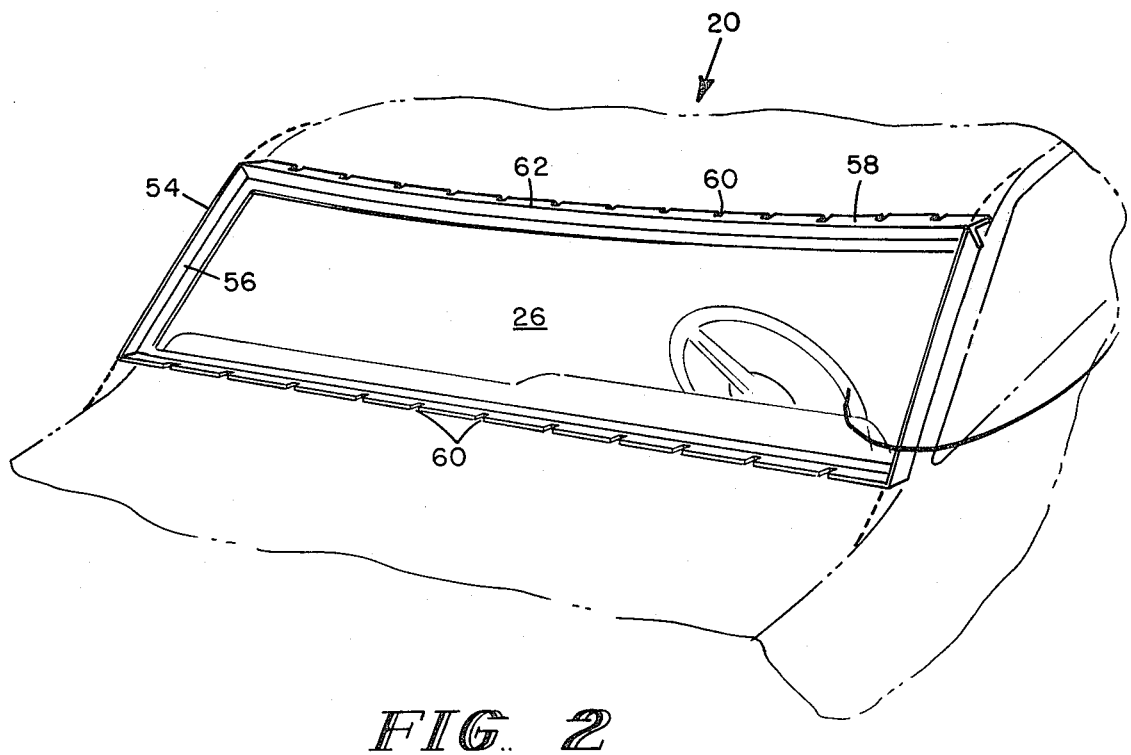
FIG. 2 is a perspective view of a new frame for a windshield to receive a bulletproof window therein with an automobile being shown in reference lines.
Figure 5:
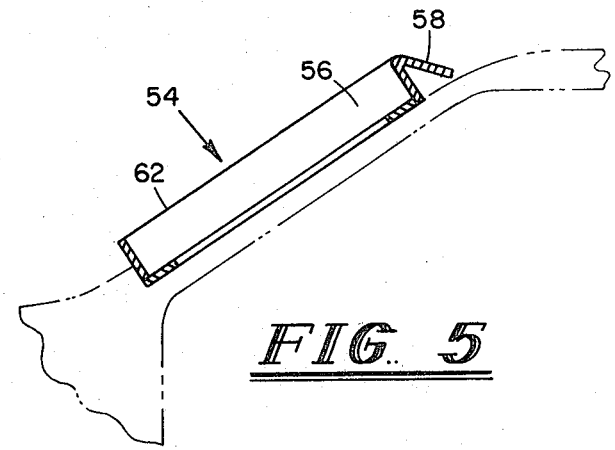
FIG. 5 is a partial sectional perspective view of the frame shown in FIG. 2 for front and rear windows.

Referring now to FIG. 2 of the drawings, the front and rear window frames 54 are shown in a perspective view with the car 20 being shown in reference lines. The new contour of the automobile adjacent to the window frame 54 is shown in dotted lines. The window frame 54 is formed from angle iron having an acute angle (see FIG. 5). The window abutting portion 56 of the window frame 54 extends basically perpendicular to the outer surface of the windshield 26 and in a contiguous parallel relationship to the edges of the windshield 26. It is necessary to extend the depth of the frame normally holding the windshield 26 therein due to the increased thickness of the new windshield formed from safety plate glass and a polycarbon laminate. The outer support portion 58 of the window frame 54 is notched by cuts 60 extending from the outer edge to a close proximity with the window abutting portion. The notches provided by cuts 60 allow for bending to form the window frames 54. After the window frames have been formed, the cuts 60 are welded to provide a secure window frame 54. The entire window frame 54 is then welded to the body of the automobile 20. Rough surfaces that may interfere with the insertion of the windshield 26 or rebuilding of the body of the automobile 20 are ground smooth. The contour of the body of the automobile 20 is then reformed by any conventional means, such as body putty, to extend to the outer edge 62 of the window frame 54. The new contour of the body of the automobile 20 is represented by dotted lines in FIG. 2.

Figure 3:
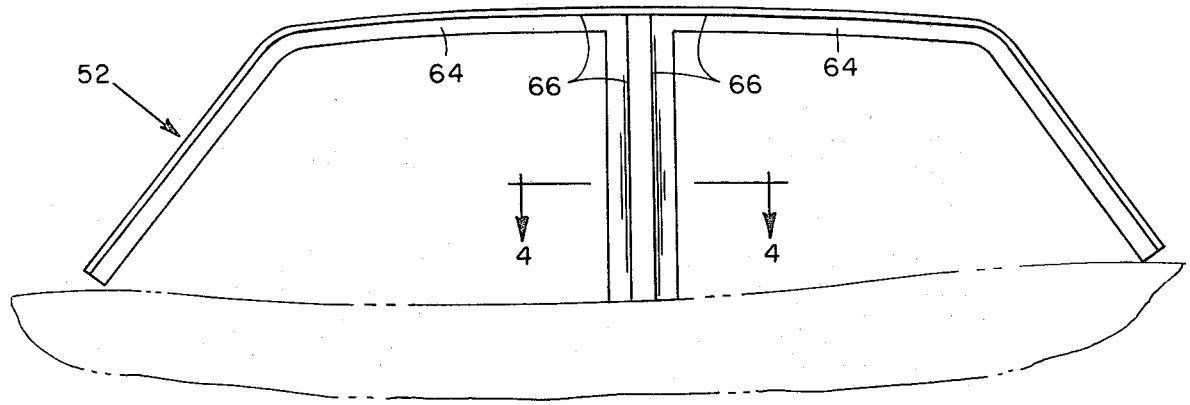
FIG. 3 is an elevated side view of a new door frame to receive a bulletproof window therein.
Figure 4:
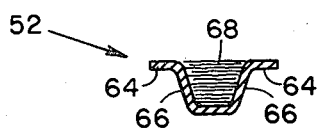
FIG. 4 is a cross-sectional view of FIG. 3 along section lines 4—4.

Referring now to FIGS. 3 and 4 in combination, the door frames 52 as previously shown in FIG. 1 will be explained in more detail. Assume that the front and rear door windows 30 and 32 have not been installed. The door frame 52 has a flat vertical interior surface 64 against which windows 30 and 32 seal. The outwardly extending surfaces 66 are parallel to and contiguous with the edges of the windows 30 and 32. The center post portion of the door frame 52 is filled with a lightweight bullet-resistant material 68, such as multi-layers of Kevlar.

Figure 6:
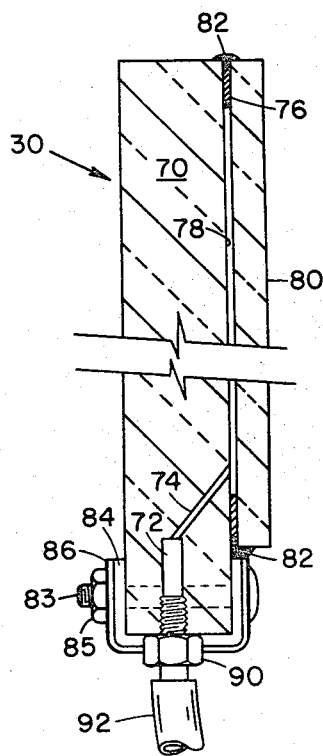
FIG. 6 is an elevated sectional view of a typical side window of the retrofitted armored vehicle shown in FIG. 1.
Figure 7:
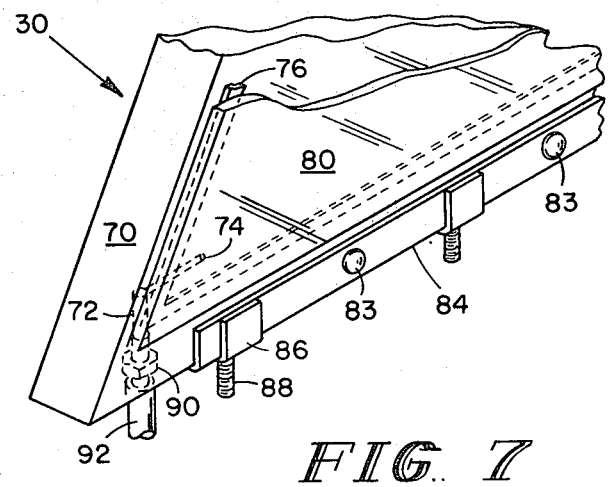
FIG. 7 is a typical partial perspective view of a lower front corner of a front side window of the vehicle shown in FIG. 1.

Referring to FIGS. 6 and 7 of the drawings in combination, the structure of the front door window 30, which is generally the same as all side windows, is shown in more detail. First, a polycarbon laminate 70 is cut to the general shape of the space provided for the window in door frames 52. The polycarbon laminate 70 is typically sold under the name Lexgard. The polycarbon laminate 70 has a threaded hole 72 formed in the lower edge thereof with a slanted hole 74 connecting the threaded hole 72 with the outer surface of the polycarbon laminate 70. A double-sided tape 76 is applied to the outer surface 78 of the polycarbon laminate 70 around the periphery thereof. A safety plate glass 80 having the same general flat dimensions as the polycarbon laminate 70, except it does not extend downwardly as far, is attached to the opposite side of the double-sided tape 76 which is approximately 1/16 of an inch thick. Next, the outer edge between the polycarbon laminate 70 and the safety plate glass 80 is sealed with a silicone-type sealant 82.

The lowermost portion of the polycarbon laminate 70 is fitted inside of a channel 84 as shown in FIGS. 6 and 7. The channel 84 may be attached to the polycarbon laminate 70 by any suitable means, such as cross bolts 83 and nuts 85. A mounting bracket 86 having a rigidly secured mounting bolt 88 therein is attached to the channel 84 by any suitable means, such as welding. The mounting bolts 88 extend downwardly from respective mounting brackets 86 on the channel 84.

After the window 30 is formed as shown in FIGS. 6 and 7, it is allowed to set for 24 hours. The space between the polycarbon laminate 70 and the safety plate glass 80 is filled with a low pressure nitrogen via valve fitting 90. The valve fitting 90 is connected via a tube 92 to a low pressure nitrogen container (now shown), which would normally be inserted inside of the door panel. The purpose of the nitrogen is to act as a drying agent to prevent clouding between the polycarbon laminate 70 and the safety plate glass 80. Also, the space therebetween is necessary to provide for the different rates of expansion between the polycarbon laminate 70 and the safety plate glass 80. In this preferred embodiment, the safety plate glass 80 would typically be $\frac{1}{4}$ of an inch thick, and the polycarbon laminate 70 approximately $1\frac{1}{4}$ inches thick.

Figure 8:
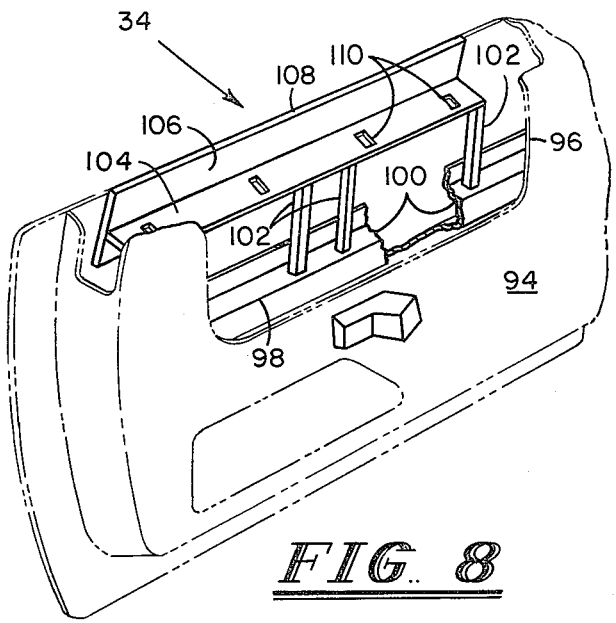
FIG. 8 is an inside perspective view of a door for the automobile shown in FIG. 1 after stripping the interior, removing the window mechanisms, and installing supports for a new bulletproof window.
Figure 9:
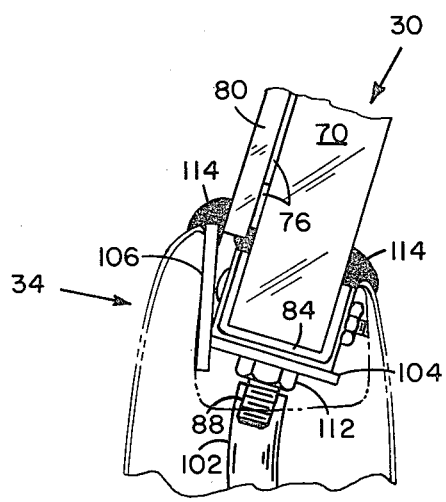
FIG. 9 is a partial elevated sectional view of FIG. 8 after installation of the bulletproof window.

Referring to FIGS. 8 and 9 in combination, the first step in retrofitting automobile 20 for armor is to strip the interior from the automobile. In the doors, such as front door 34 shown in FIG. 8, the window mechanism is removed and an upper portion of the internal wall 94 of the door 34 is cut away as shown by opening 96. A cross brace 98 is normally contained inside of the door of most automobiles. However, in the model shown in FIG. 8, the cross brace 98 has a considerable width therefore a portion of the cross brace 98 is cut out as shown by reference numeral 100 to allow room for a gun port as will be subsequently explained in more detail.

Extending upward from cross brace 98 are window support posts 102 that connect to the cross brace 98 by any suitable means, such as welding. The upper portion of the window support post 102 connects to an elongated plate 104 inside of front door 34, which elongated plate 104 is mounted at a slight incline as shown in FIG. 9. The elongated plate 104 is rigidly attached to a vertical side plate 106 that extends to the top 108 of the door 34.

The front door window 30 as shown in FIGS. 6 and 7 is secured in position by inserting the mounting bolts 88 inside of slots 110 provided in elongated plate 104 shown in FIGS. 8 and 9. Nuts 112 threadably connected to mounting bolts 88 secure the window 30 in position. Molding 114 is positioned around the edges of the window 30 in the conventional manner.

Figure 10:
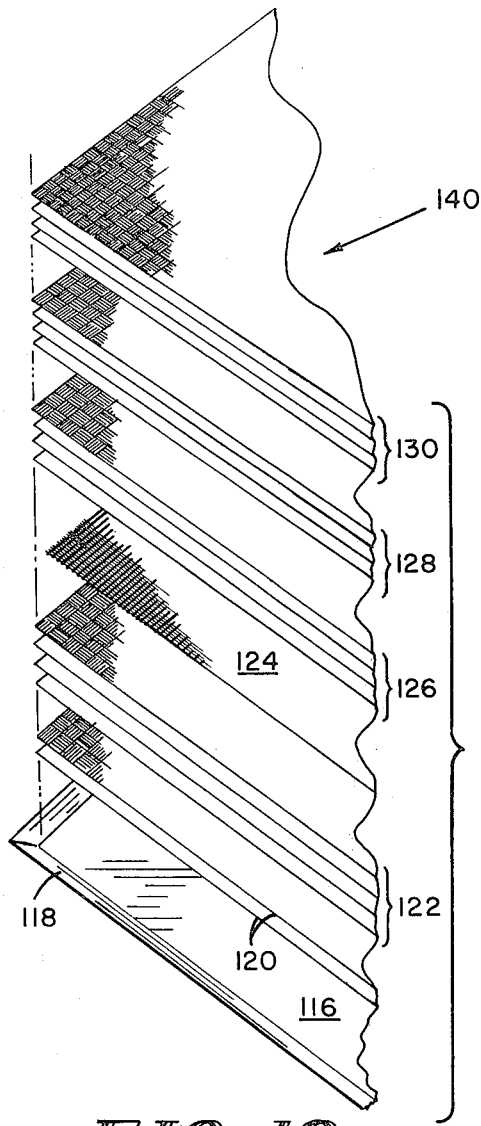
FIG. 10 is an exploded partial perspective view showing construction of the lightweight woven polyglass material as rigidly formed with a resin-catalyst mixture.

Referring now to FIG. 10 of the drawings, the woven multilayer fiberglass material is shown in an exploded partial perspective view illustrating the numerous layers and method for manufacturing in a rigid assembly using a resin-catalyst mixture. In the description of FIG. 10, a typical method of making the rigid woven fiberglass is described. A tray 116 is shown with an upwardly flared outer edge 118 to retain the resin-catalyst mixture therein. Two layers 120 of woven polyglass are laid inside of tray 116. Approximately $6\frac{1}{2}$ pounds of mixture is spread uniformly over the two layers of woven polyglass. Next, four layers of woven polyglass 122 are applied on top of the first two layers 120. Again, approximately $6\frac{1}{2}$ pounds of mixture are applied to the four layers 122. Next, as an optional feature that could increase the bullet-resistant strength of the rigidly formed woven polyglass is a sheet of woven steel 124 as will be explained in more detail subsequently. The woven steel 124 stops short of the edges of the four layers of woven polyglass 122 to allow bonding with subsequent layers around the outer edges. Next, four more layers of woven polyglass 126 are placed on top of the woven steel 124, which layers 126 extend beyond the edges of the woven steel 124 to bond with the edges of the four layers 122. Again, approximately $6\frac{1}{2}$ pounds of mixture is uniformly applied to the four layers 126. Again, four layers of woven polyglass 128 are placed on top of the layers 126 and $6\frac{1}{2}$ pounds more of mixture applied thereto. Finally, the last four layers of woven polyglass 130 is placed on top of the four preceding layers 128.

All of the layers 120, 122, 124, 126, 128 and 130 are inserted inside of a machine with tray 116 wherein the layers of polyglass and resin-catalyst mixture are heated and compressed to form a rigid woven polyglass material. To prevent sticking either to the tray 116 or to the machine, it may be necessary to have an upper and lower layer of plastic enclosing the various layers of polyglass woven steel and resin-catalyst mixture. Pressure and heat are applied to the layers of polyglass and resin to cause a uniform distribution of the resin-catalyst throughout the polyglass material. As the mixture hardens, a rigid woven polyglass sheet is formed.

Figure 11:
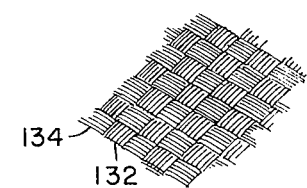
FIG. 11 is an enlarged partial perspective view illustrating weave of a single sheet of the lightweight woven polyglass material.

Referring now to FIG. 11, an enlarged partial sectional view of the woven polyglass material is shown. A first plurality of strands of fiberglass forms a first ribbon 132 that extends in a first direction. A second plurality of strands of fiberglass forms a second ribbon 134 that extends in a second direction perpendicular to the first ribbon 132. By interweaving a plurality of first and second ribbons 132 and 134 as shown in FIG. 11, a sheet of flat, flexible polyglass material is formed. A typical such flexible woven polyglass sheet is manufactured and sold by Fiber Glass Industries Incorporated and called Woven Glass Roving Style 775.

Figure 12:
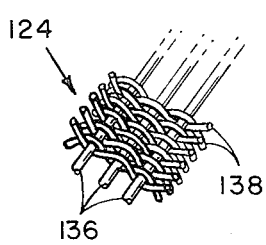
FIG. 12 is an enlarged partial perspective view of the woven steel embedded in the rigidly formed woven polyglass.

Refering now to FIG. 12, the woven steel 124 is shown wherein large steel wires 136 extend parallel in a first plane. Smaller guage steel wires 138 are interwoven in the same plane about the large steel wires 136 to form a woven steel screen. A typical example of such woven steel 124 is manufactured by Sherwatt Wire Cloth Company, Inc. and called Plain Steel Carbon Wire Cloth, 24 by 110 mesh. The woven steel 124 is an optional feature that may or may not be included within the rigidly formed woven polyglass. The steel screen 124 helps disperse and fragmentize a projectile so that its impact will be spread over a larger area thereby considerably increasing the strength of the woven polyglass material 140 shown in FIG. 10 upon rigidly forming as described hereinabove.

Figure 14:
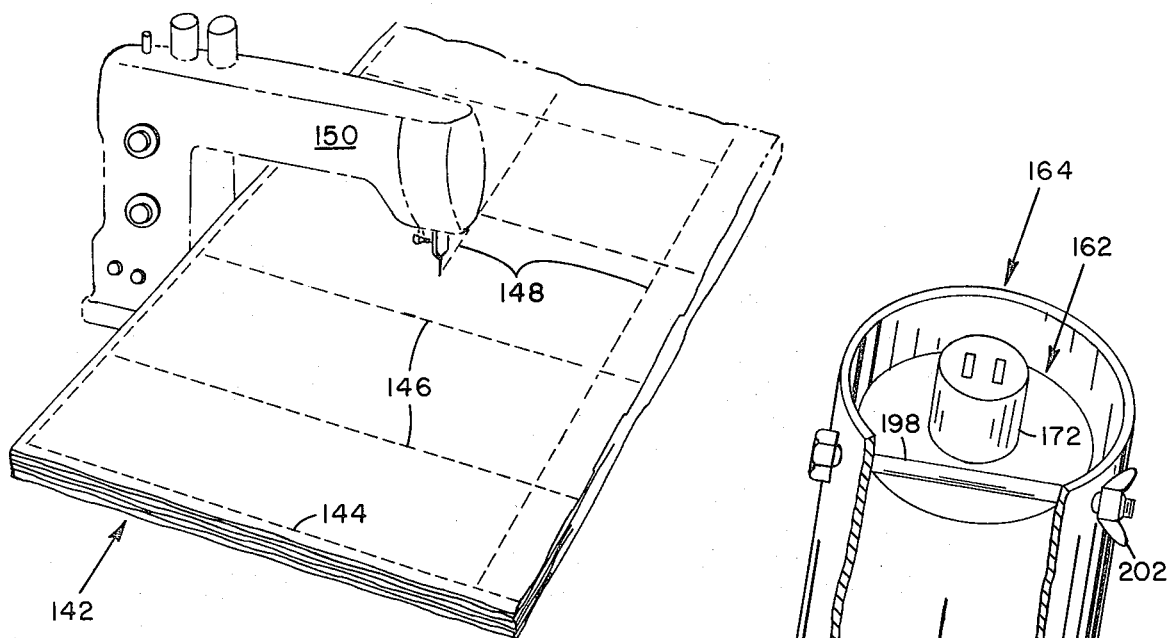
FIG. 14 is a partial perspective view illustrating the formation of multi-layer Kevlar or ballistic nylon.

Two different types of flexible multi-layer material are used in the armoring of the automobile 20. One is a common ballistic nylon and the other is a ballistic material sold under the trademark Kevlar. The various layers are cut and stacked one upon the other, and sewn together as shown in the pictorial view of FIG. 14. Assume in FIG. 14 the material being sewn together is ballistic nylon 142. The outer edge of the ballistic nylon 142 is sewn together by stitching 144 around its outer perimeter. Next, cross-stitching is periodically spaced along the sheet of multi-layer ballistic nylon 142. Longitudinal stitching 148 is sewn in the ballistic nylon 142 perpendicular to the cross-stitching 146. Finally, patterns are marked on the sheet of ballistic nylon 142 to be used in the armor of the automobile 20. The patterns are then cut and the industrial sewing machine 150 is used to sew the outer perimeter of the various patterns. In the sewing of the ballistic nylon 142, as well as the Kevlar, the stitch spacing and the tightness of the stitch has to be fairly accurately controlled to obtain the optimum tightness and spacing. By obtaining the optimum tightness and spacing in the stitches the resistance to projectiles therethrough is increased. For the ballistic nylon, the optimum spacing between stitches varies between a range of $\frac{1}{8}$ inch to $\frac{1}{4}$ inch apart. The tightness of the stitching should be between a medium-to-firm tightness. The stitching should be repetitive in cross stiched squares between 4 to 6 inches per side.

The Kevlar is formed into multiple layers basically the same as the ballistic nylon. However, the spacing between stitches of the Kevlar for optimum strength should be between $\frac{1}{8}$ to $\frac{1}{4}$ inch. The tightness of the stitching should be between a medium-to-firm tightness. The stitching should be repetitive in cross stitched squares between 4 to 6 inches per side.

Figure 13:
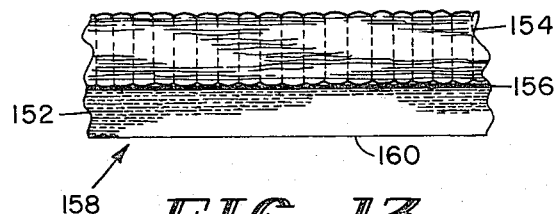
FIG. 13 is a cross-sectional view of the Kevlar as attached to the rigidly formed polyglass.

The ballistic nylon, which is bulkier than the Kevlar, is normally used in the floorboard or floor panel 24 and in the top 24 as part of the headliner where space is not as critical. In the doors of the automobile 20 or in the kick panels, the Kevlar is used normally in combination with 18-ply woven rigid polyglass. However, in certain situations, a lower ply of woven rigid polyglass may be used with a resultant reduction and projectile penetration strength. Assume, for example, that the door of an automobile should have an 18-ply woven rigid polyglass 152 (without the woven steel 124) as shown in FIG. 13. Next, assume a 24-ply Kevlar 154 is necessary to obtain the desired resistant strength to bullet penetration. A 24-ply Kevlar 154 is bonded to the 18-ply woven rigid polyglass 152 by a suitable bonding material, such as silicone 156. For additional strength around the edges, pop rivets may be inserted through the entire protective sheet 158, especially around the outer edges thereof, and periodically throughout the center portion.

Since the Kevlar deteriorates if it comes in contact with moisture, the entire protective sheet 158 is encapsulated in a water resistant material, such as a thin layer of plastic. Assume that a bullet is fired into the side of automobile 20 so that it strikes the protective sheet 158 approximately perpendicular to surface 160. The 18-ply woven rigid polyglass 152 would tend to flatten and disperse the projectile with the 24-ply Kevlar 154 catching any remaining fragments or portions of the projectile.

Figure 15:
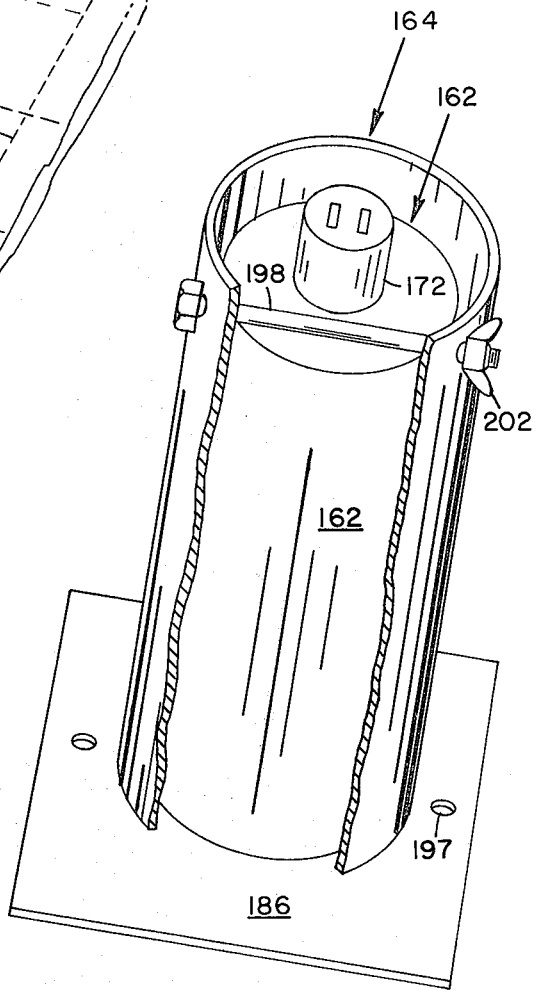
FIG. 15 is a perspective view of a tear gas cannister installation system with a portion sectionalized.
Figure 16:
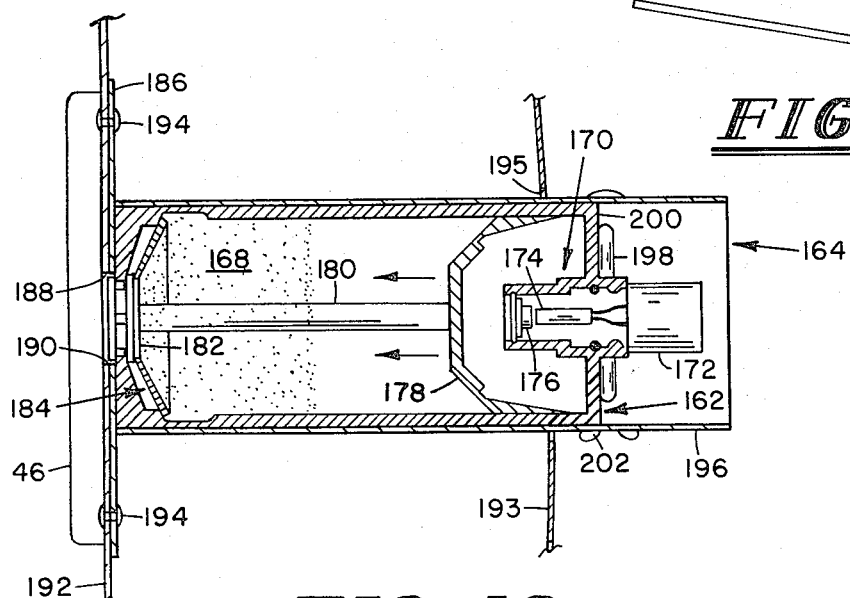
FIG. 16 is a sectional view along the longitudinal axis of the tear gas cannister shown in FIG. 15.

Referring to FIGS. 15 and 16 in combination, a tear gas distribution system located behind the reflectors 46 of the automobile 20 shown in FIG. 1 is shown in more detail. A tear gas cannister 162 has a powdered tear gas substance 168 contained in the main chamber thereof. The firing portion 170 of the tear gas cannister 162 has a female electrical plug 172 which connects to an electrical match 174 which creates an arc thereacross. Firing cap 176, which may consist of black powder, is ignited thereby driving the piston 178 in the direction indicated by the arrows. The piston rod 180 forces the pop cap 182 off the end 184 of the cannister 162. Also, the reflector 46 shown in FIG. 1 is blown off the side of the vehicle 20. The movement of the piston towards end 184 disperses the powdered tear gas substance 168 outwardly from the armored vehicle 20.

To secure the tear gas cannister 162 in position, it is contained in a tear gas cannister housing 164 which has a flat plate 186 with an opening 188, that coincides with opening 190 of the fender of the automobile 20. The flat plate 186 is secured to the fender 192 of the automobile 20 by means of rivets 194 extending through holes 197 of the flat plate 186. The rivets 194 are hidden behind the reflectors 46. The tear gas cannister 162 is secured in position by means of an open ended cylinder 196 secured to the flat plate 186 by any suitable means, such as welding. Also, bolt 198 extends across the open ended cylinder 196, offset from the center thereof, in a close abutting relationship with the end shoulder 200 of the tear gas cannister 162. The bolt 198 is secured in position by wing nut 202. Internal well 193 provides additional support for the rear portion of the housing 164 which is received inside of opening 195 in a close fit relationship.

By an electrical connection from the female plug 172 to the control panel of the automobile 20, the tear gas cannister 162 can be fired thereby dispensing the powdered tear gas substance 168 out the openings 188 and 190 for dispersal radially from the automobile 20. Any number of tear gas cannisters could be contained on an automobile with different orders of firing, but in this preferred embodiment, it is envisioned that one tear gas cannister would be contained in each fender and that diagonally opposing tear gas cannisters would be simultaneously fired.

Figure 18:
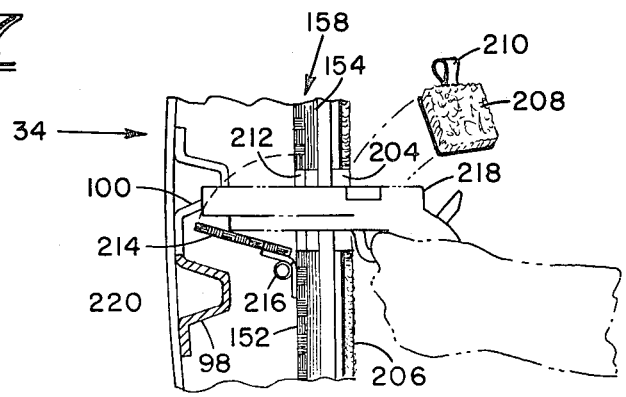
FIG. 18 is a partial elevated sectional view of the door illustrating use of gun parts.

Previously in the description of FIG. 8, a cutout portion 100 of cross brace 98 was described for front door 34. The cutout portion allows a gun port to be installed. The gun port shown in FIG. 18 has an opening 204 in the interior panel 206 normally covered by covering block 208 that may be easily removed by tab 210. Another hole 212 adjacent to hole 204 is cut in the protective shield 158 that includes the Kevlar 154 and the rigid woven polyglass 152. A protective flap 214 formed from multi-ply woven rigid polyglass is pivotedly mounted on the protective shield 158 by a spring-loaded hinge 216.

By a quick removal of the covering block 208 by tap 210, gun 218 can be inserted through openings 204 and 212 thereby pushing the protective flap 214 out of the way and subsequently fired through the outer skin 220 of the door 34. The skin 220 will not substantially interfere with the projectile path of a bullet from a normal hand gun in a close attack situation.

Figure 17:
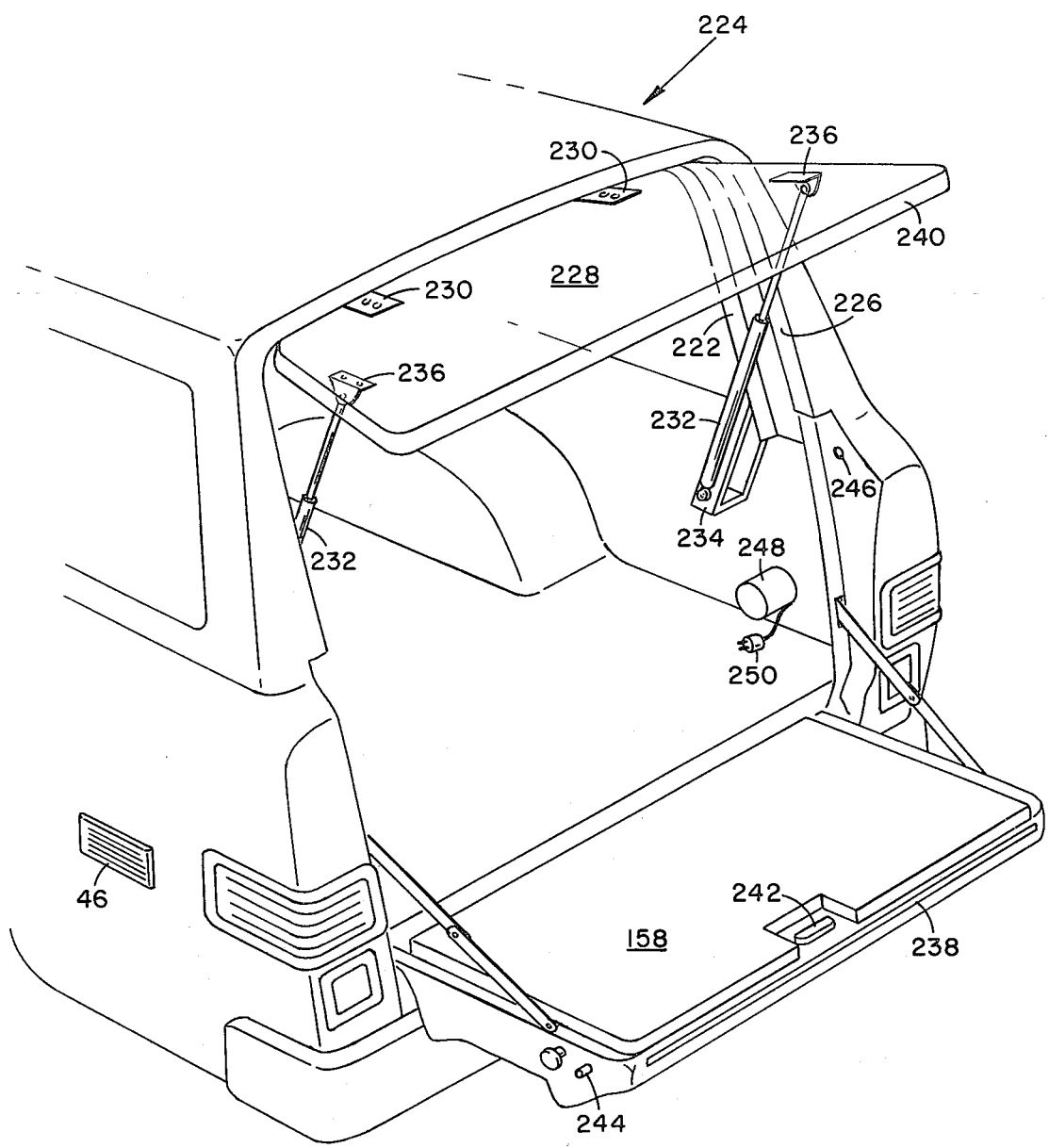
FIG. 17 is a partial perspective view indicating the installation of armor in the rear of an automobile, such as a Jeep Wagoner.

Referring now to FIG. 17, the method of securing armor for the rear portion of a vehicle, such as a Jeep Wagoner or International Scout, is shown. In prior designs, considerable problems have occurred in creating a good seal between the rear window and the frame of the automobile. In the present design, it is envisioned that the seal of the automobile will not be disturbed with all armor being contained inside thereof. An additional frame 222 for the vehicle 224 is mounted adjacent to the normal frame opening 226. A Lexgard laminate is pivotally mounted inside of frame 222 by means of hinges 230 so that it will open outward through normal frame opening 226. Springloaded cylinders 232 are attached by special bracket supports 234 and by a mounting plate 236 to aid in the opening of the protective Lexgard laminate 228. The lower edge 240 of the Lexgard laminate 228 extends below the upper portion of the tailgate 238, which has a retractable rear window. The tailgate 238 is protected by a protective sheet 158 mounted thereto. Further, to prevent an individual from breaking the rear window and opening the tailgate 238 by means of handle 242, deadbolt locks 244 are electrically operated by solenoids to extend into holes 246.

The tear gas cannister 162 can be seen as mounted inside of decorative cover 248, which covers the tear gas cannister 262 and tear gas cannister housing 264. For illustrative purposes, the electrical connection 250 thereto is shown outside the decorative cover 248.

The vehicle 222 contains normal protective armor as previously described in conjunction with automobile 20, such as multiple-ply ballistic nylon in the floor and headliner, Lexgard laminate in the side windows, and protective sheets 158 in the side panels. Wheel wells may be protected by any of a number of ways, such as multi-layers of ballistic nylon, Kevlar, and/or rigid woven fiberglass.

The above described principles can also be used to install lightweight armor in new automobiles. Instead of rebuilding the frames of the windows for the thicker glass, the automobile as originally manufactured could receive the thicker polycarbon laminate or Lexgard laminate with either the safety plate or bullet-resistant glass. As originally assembled, the multi-layer ballistic nylon or Kevlar could be installed with the rigid woven polyglass to provide from the factory a lightweight armored vehicle. Optional features such as the tear gas dispersal system could be part of the original automobile, thereby not requiring retrofitting.

I claim:

1. An automobile having an enclosed passenger compartment with doors for entering and leaving said passenger compartment, having walls, ceilings and floors, wheels and an engine for turning some of said wheels through a drive train and transmission to move said automobile, said automobile having improvements to resist attack comprising:
    permanently installed bullet resistant windows for said passenger compartment;
    multi-layer woven polyglass sheet rigidly formed with a resin-catalyst mixture in combination with multi-layer ballistic cloth being installed in said doors and said walls of said passenger compartment, said multi-layer ballistic cloth being further installed in said ceiling and floor of said automobile;
    said walls of said automobile adapted by installing therein an outer layer of multi-layer rigidly woven polyglass sheets and bonded thereto an inner layer of multi-layer ballistic resistant cloth to prevent penetration by projectiles, such as bullets fired by super power small arms;
    said bullet-resistant windows, multi-layer rigidly woven polyglass sheets, and multi-layer ballistic cloth overlapping and securing said passanger compartment against penetration by most projectiles in event of attack thereby providing lightweight armor to protect passengers in said automobile without significantly decreasing mobility.

2. The armored automobile as described in claim 1 wherein some of said bullet-resistant windows are side windows, said side windows having a first layer of safety glass and a second layer of transparent bullet-resistant polycarbon laminate, said first layer being spaced from said second layer by a spacer means and sealed thereto by sealer means, a low pressure fluid drying agent connecting to a space between said first and second layers via passage means to prevent condensation in said space.

3. The armored automobile as described in claim 2 wherein front and rear of said bullet-resistant windows have at least two layers comprising thick bullet-resistant glass and bullet resistant polycarbon laminate installed in a front and rear window frame, respectively.

4. The armored automobile as described in claim 1 wherein said ballistic resistant cloth is protected against moisture by encapsulating in an impermeable material at least in said side walls.

5. The armored automobile as described in claim 4 wherein said ballistic resistant cloth in said side walls is an aromatic polyamide material, and in said ceiling and said floor commonly is ballistic nylon, said ballistic resistant cloth being secured in position by a silicone bonding agent.

6. A method of retrofitting a standard automobile for lightweight armor consisting of the following steps:
    removing interior furnishing and windows from a passenger compartment of said automobile;
    taking window operating mechanisms out of said automobile;
    reframing windows and doors to receive bullet resistant windows therein;
    contouring said automobile adjacent said reframed windows for said windows;
    inserting rigidly woven polyglass and ballistic resistant cloth in doors and walls of said passenger compartment;
    installing said ballistic resistant cloth in floors and ceiling of said passenger compartment;
    reinforcing frames of said passenger compartment;
    refurbishing said interior furnishing of said passenger compartment;
    said reinforced framing, bullet resistant windows, rigidly woven polyglass and ballistic resistant cloth creating overlapping barriers to penetration of said passenger compartment by most projectiles in event of attack with a minimum increase in weight.

7. The method as described in claim 6 including a step of adding a tear gas dispersal system by tear gas cannisters with electrical firing caps mounted adjacent to openings in vertical walls of said automobile, switch means from a battery to said tear gas cannister causing tear gas to be dispersed radially through said openings upon closure of said switch means.

8. The method as described in claim 7 including steps of wrapping a fuel tank of said automobile in said ballistic resistant cloth and encasing said battery in said rigidly woven polyglass.

9. The method as described in claim 6 wherein said automobile has a relatively vertical rear, such as a Jeep Wagoner, said automobile having a tailgate with a retractable rear window, said reframing step includes securing an auxiliary rear frame for mounting said bullet-resistant window therein to pivot upwardly through an original rear window frame without disturbing sealing between said retractable rear window and said original rear window frame, said inserting step including attaching said rigidly woven polyglass to said tailgate to overlap with said rear bullet-resistant window.

10. The method as described in claim 9 further includes providing electrically operated deadbolt locks in sides of said tailgate to prevent opening except from said passenger compartment even if said retractable rear window is broken.

11. The method as described in claim 6 wherein said taking window operating mechanism out includes cutting an opening in an upper interior portion of each of said doors, said reframing includes bracing a mounting plate for bullet resistant door windows from an internal cross brace of said doors, said mounting plate being attached to said doors and said bullet resistant door windows.

12. The method as given in claim 6 wherein said reframing step includes building deeper front and rear window frames outward from original front and rear window frames to receive bulletproof glass therein, said contouring step includes building outward on body portion of said automobile to appear as if said deeper front and rear window frames are original.

13. The method as given in claim 12 wherein said reframing step includes building deeper side window frames to receive layered safety plate glass and a bullet resistant polycarbon laminate therein yet appear as original side window frames.

14. The method as given in claim 6 including additional steps of forming said rigidly woven polyglass from sheets of woven fiberglass material embedded in a resin-catalyst mixture uniformly distributed under pressure and heat, cutting pieces of said rigidly woven polyglass to match locations for said inserting in said doors and walls, said rigidly woven polyglass optionally including woven steel as one layer therein.

15. The method as given in claim 14 including an additional step of sewing said ballistic resistant cloth in multiple layers and cutting to match locations for said inserting and said installing, at least some of said ballistic resistant cloth being protected from moisture by an impermeable outer layer.

16. The metod as given in claim 15 includes attaching said ballistic resistant cloth by a silicone bonding means, said ballistic resistant cloth including ballistic nylon and an armoatic polyamide material.

17. An automobile having an enclosed passenger compartment with doors for entering and leaving said passenger compartment, having walls, ceiling and floors, wheels and an engine for turning of said wheels through a drive train and transmission to move said automobile, said automobile having improvements to resist attack comprising:

permanently installed bullet resistant windows for said said passenger compartment;

multi-layer polyglass sheets rigidly formed with a resincatalyst mixture in combination with multi-layer ballistic cloth being installed in said doors and said walls of said passenger compartment, said multi-layer ballistic resistant cloth being further installed in said ceiling and floor of said automobile;

side walls of said automobile adapted by installing therein an outer layer of mutli-layer rigidly woven polyglass sheets and bonded thereto an inner layer of multi-layer ballistic resistant cloth to prevent penetration by projectiles, such as bullets fired by super power small arms;

a fuel tank of said automobile wrapped in multi-layer ballistic resistant cloth and a battery of said automobile encased in multi-layer rigidly woven polyglass sheet to prevent explosion; and electrically ignited tear gas cannisters attached at a plurality of locations along said walls, switch means electrically connected between said battery and said cannisters for discharging tear gas radially through ports at said locations in said walls in response to closure of said switch means, said electrical ignition having electrical match means for creating an arc to ignite an explosive charge, said cannisters being retained in housing means mounted behind said ports to maintain discharge ends of said cannisters adjacent said ports;

said bullet resistant windows, multi-layer rigidly woven polyglass sheets, and multi-layer ballistic resistant cloth overlapping and securing said passenger compartment against penetration by most projectiles in event of attack thereby providing lightweight armor to protect passengers in said automobile without significantly decreasing mobility.

* * * * *